United States Patent
Nethi et al.

(10) Patent No.: US 8,397,158 B1
(45) Date of Patent: Mar. 12, 2013

(54) SYSTEM AND METHOD FOR PARTIAL PARSING OF XML DOCUMENTS AND MODIFICATION THEREOF

(75) Inventors: Ramesh Nethi, Bangalore (IN); Kousik Nandy, Bangalore (IN)

(73) Assignee: Sonoa Networks India (PVT) Ltd, Bangalore (IN)

( * ) Notice: Subject to any disclaimer, the term of this patent is extended or adjusted under 35 U.S.C. 154(b) by 827 days.

(21) Appl. No.: 12/058,762

(22) Filed: Mar. 31, 2008

(51) Int. Cl.
*G06F 15/00* (2006.01)

(52) U.S. Cl. ......... 715/234; 715/255; 715/237; 715/240

(58) Field of Classification Search .................. 715/234, 715/237, 255
See application file for complete search history.

(56) References Cited

U.S. PATENT DOCUMENTS

| | | | |
|---|---|---|---|
| 7,073,123 B2* | 7/2006 | Friedman et al. | 715/240 |
| 7,120,663 B2* | 10/2006 | Maesaka et al. | 709/203 |
| 7,499,921 B2* | 3/2009 | Raghavachari | 1/1 |
| 7,665,016 B2* | 2/2010 | Behrens et al. | 715/237 |
| 2004/0034830 A1* | 2/2004 | Fuchs et al. | 715/501.1 |
| 2004/0167864 A1* | 8/2004 | Wang et al. | 707/1 |
| 2004/0172599 A1* | 9/2004 | Calahan | 715/513 |
| 2004/0261019 A1* | 12/2004 | Imamura et al. | 715/513 |
| 2005/0055355 A1* | 3/2005 | Murthy et al. | 707/100 |
| 2005/0203957 A1 | 9/2005 | Wang | |
| 2006/0106831 A1 | 5/2006 | Nakanishi | |
| 2007/0198919 A1* | 8/2007 | Clarke et al. | 715/513 |
| 2007/0283245 A1 | 12/2007 | Masood | |
| 2007/0288840 A1* | 12/2007 | Girle et al. | 715/513 |
| 2009/0271695 A1* | 10/2009 | Ruellan et al. | 715/227 |

OTHER PUBLICATIONS

Jeow Li Fook, Integrity Constraints and XML: Semantic XPath Query Transformation, 2005/2006, Department of Computer Science School of Computing National University of Singapore, Honours Year Project Report.*
Michael Benedikt et al, PLAN-X 2007 Programming Language Technologies for XML, Jan. 20, 2007, ACM SIGPLAN.*

* cited by examiner

*Primary Examiner* — Cesar Paula
*Assistant Examiner* — Mohammed-Ibrahim Zuberi
(74) *Attorney, Agent, or Firm* — Evergreen Valley Law Group, P.C.; Kanika Radhakrishnan

(57) ABSTRACT

Modifying a partially parsed Extensible Markup Language (XML) document. A stop node in an XML document is marked using at least one stop XPath expression. The XML document is then parsed till the stop node identified by the at least one stop XPath expression. Modifications to the XML document are specified in a modification script, including at least one modification instruction. A modification instruction includes a context node XPath expression which identifies a context nodeset requiring modifications, and the actual modification content. Sequence of event tokens corresponding to the parsed XML document are then stored. Further, the XML document is modified according to the modification script.

13 Claims, 5 Drawing Sheets

SYSTEM AND METHOD FOR PARTIAL PARSING OF XML DOCUMENTS AND MODIFICATION THEREOF

BACKGROUND

1. Technical Field

Embodiments of the invention relate generally to information processing and more particularly to partial parsing and modification of Extensible Markup Language (XML) documents.

2. Prior Art

XML refers to (World Wide Web Consortium) W3C standard for creating markup languages that describe the structure and interrelationships of data. XML is not a single, predefined markup language rather a metalanguage (a language for describing other languages). Last few years, XML has become lingua-franca of the internet and World Wide Web (WWW). It has become the most common mechanism for structured data representation, exchange and storage.

In the aforementioned XML applications, it is critical that the data contained in XML documents be processed. There are several ways in which XML documents can be processed, modified and data retrieved therefrom. Several languages such as XPath, XSLT and XQuery allow performing queries on XML documents to locate information items, process and modify XML documents. XPath refers to a language standardized by W3C for querying XML documents. It treats an XML document as a logically ordered tree of nodes and provides a means to locate and identify XML elements and attributes.

In traditional approaches to XML modification, a Document Object Model (DOM) is followed. In following the DOM approach, the XML document is converted to a tree format with the help of a DOM parser and this DOM tree is stored in memory. While this approach works in case of smaller documents, it has severe limitations when it comes to processing of larger XML documents especially because the size of the document to be stored is usually 7-10 times the size of the original XML document. Thus, in case of large documents, following the DOM approach is a constraint in terms of memory, time, cost and application performance. Further, DOM allows modification of XML documents only if a complete in-memory data structure is formed. Thus, a DOM approach to modify an XML document has its limitations in instances where owing to memory limitations, a complete DOM tree cannot be stored in memory.

In order to address the challenges posed by DOM approach, alternative approaches such as Simple API for XML (SAX) were developed. In contrast to DOM approach, SAX approach does not require loading of the complete XML document into memory. Rather SAX refers to presenting the document as a serialized stream of events. In other words, SAX is event driven and relies on a programmer to specify a particular event upon the happening of which event, XML processing happens. However, SAX approach has its own limitations as well. In following a SAX approach, the ability to navigate back and forth within in the XML document in order to make modification is restricted. This is a severe limitation of a SAX approach.

In the aforementioned approaches, the entire XML document needs to be parsed in its entirety for a modification of a portion of the XML document, regardless of how minor the modification is. This parsing of the entire document including paring of portions of an XML document that do not require modification leads to unnecessary usage of the Central Processing Unit (CPU).

Further, parsing and in-memory representation of an XML document requires significant amount of memory usage. Especially in DOM approach, if the XML document which needs to be modified is larger than, say 100 KB, memory requirements can be significantly large for a minor modification. Further, modifying an XML document using DOM API is highly programmatic and requires code changes for every new type of modification. Another problem arises in these approaches when the XML document has to be de-serialized and serialized. Serialization is involved while creating the in-memory data structure from the XML document and de-serialization is involved in converting the in-memory data structure back to the XML document. Both serialization and de-serialization are costly as well as time consuming.

Hence, there is a need to provide a method and system for parsing and modifying XML documents efficiently.

SUMMARY

Embodiments of the invention described herein provide a computer implemented method, system and a machine-readable medium product for modifying partially parsed Extensible Markup Language (XML) documents.

An exemplary embodiment of the invention provides a method for partially parsing and modifying an XML document. A stop node in an XML document is marked using at least one stop XPath expression. The XML document is then parsed till the stop node identified by the at least one stop XPath expression. A context nodeset in an XML document is also identified using a context node XPath expression which needs modification. A modification script as an input includes the context node XPath expression which identifies the context nodeset requiring modifications and the modification instruction. Further, the XML document is modified according to the modification instructions in the modification script.

An exemplary embodiment of the invention provides a system for partially parsing and modifying an XML document. The system includes an XPath parser for parsing at least one stop XPath expression. The at least one stop XPath expression identifies a stop node in the XML document and the stop node is further marked. Further, the system includes an XML parser for parsing the XML document. An XPath handler monitors XPath results generated by an XPath processor and stops the XML parser if the XPath result is the stop XPath expression. The system also includes a modification script compiler for compiling a modification script including modification instructions which includes at least one context node XPath expression. The context node XPath expression identifies a context nodeset in an XML document for modification. Further, a modification engine in the system modifies the XML document according to the modification script.

An exemplary embodiment of the invention provides a machine-readable medium product for partially parsing and modifying an XML document. The machine-readable medium product includes instructions operable to cause a programmable processor to perform marking a stop node in an XML document using at least one stop XPath expression; and parsing the XML document till the stop node identified by the at least one stop XPath expression.

Other aspects and example embodiments are provided in the Figures and the Detailed Description that follows.

DETAILED DESCRIPTION OF THE EMBODIMENTS

Embodiments of the invention described herein provide a computer implemented method, system and a machine-readable medium product for partially parsing Extensible Markup Language (XML) documents and modifying them. One embodiment of the invention provides a method for parsing only part of an XML document. Using various embodiments of the invention, the XML document can be parsed till a selected XML node (stop node) and thereby the entire XML document need not be parsed. XML parsing can be stopped after the stop node.

Embodiments of the invention have been explained using XML document as an example. However, it will be appreciated that embodiments of the invention can be used to partially parse and modify any structured document which includes information represented in a logical order. Examples of structured documents include but not limited to, Standard Generalized Markup Language (SGML) documents, XML documents and Extensible HyperText Markup Language (XHTML) documents.

In various embodiments of the invention, a modification script may include at least one modification instruction which includes a context node XPath expression which specifies where to make modifications along with modification instruction on how to modify i.e. whether a particular node has to be deleted, added, appended and so on.

Figure 1:
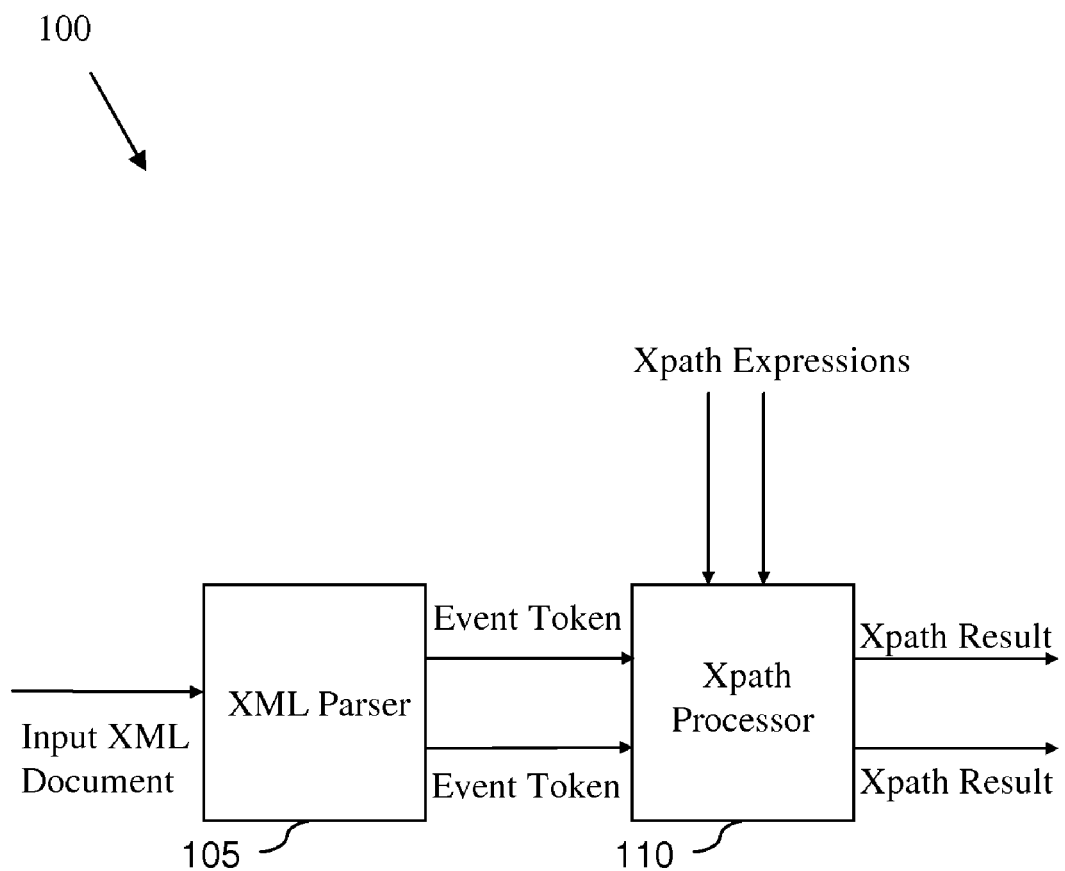
FIG. 1 is a block diagram of an environment according to an embodiment of the invention.

FIG. 1 is a block diagram of an environment 100 in accordance with an embodiment of the invention. Environment 100 includes an XML parser 105 and an XPath processor 110. XML parser 105 receives input XML document. In an embodiment of the invention, XML parser receives the XML document as a linked list of buffers. A buffer includes a temporary memory space where the XML document fragments are stored as they are received. An XML parser 105 may include an application program interface (API), for example, Simple API XML (SAX), for parsing XML documents. XML parser 105 parses an XML document to create SAX events. Each SAX event may generate multiple tokens which are hereinafter referred to as a sequence of event tokens. Further, in various embodiments of the invention, a sequence of event tokens may include binary representation of XML nodes of the XML document. An event token may further include information about the token type, unique id of the token, length of the token, flags and hash of the token text. Further, sequence of event tokens includes a direct pointer to the text in the XML document buffer.

XPath processor 110 is configured with XPath expressions. XPath processor 110 registers with XML parser 105 for receiving sequence of event tokens. XPath processor 110 evaluates XPath expressions on the sequence of event tokens. XPath processor 110 matches the sequence of event tokens to XPath expressions and returns matched XPath results. In an embodiment of the invention, XPath processor 110 may process one event token at a time and may evaluate several XPath expressions on the event token simultaneously.

Figure 2:
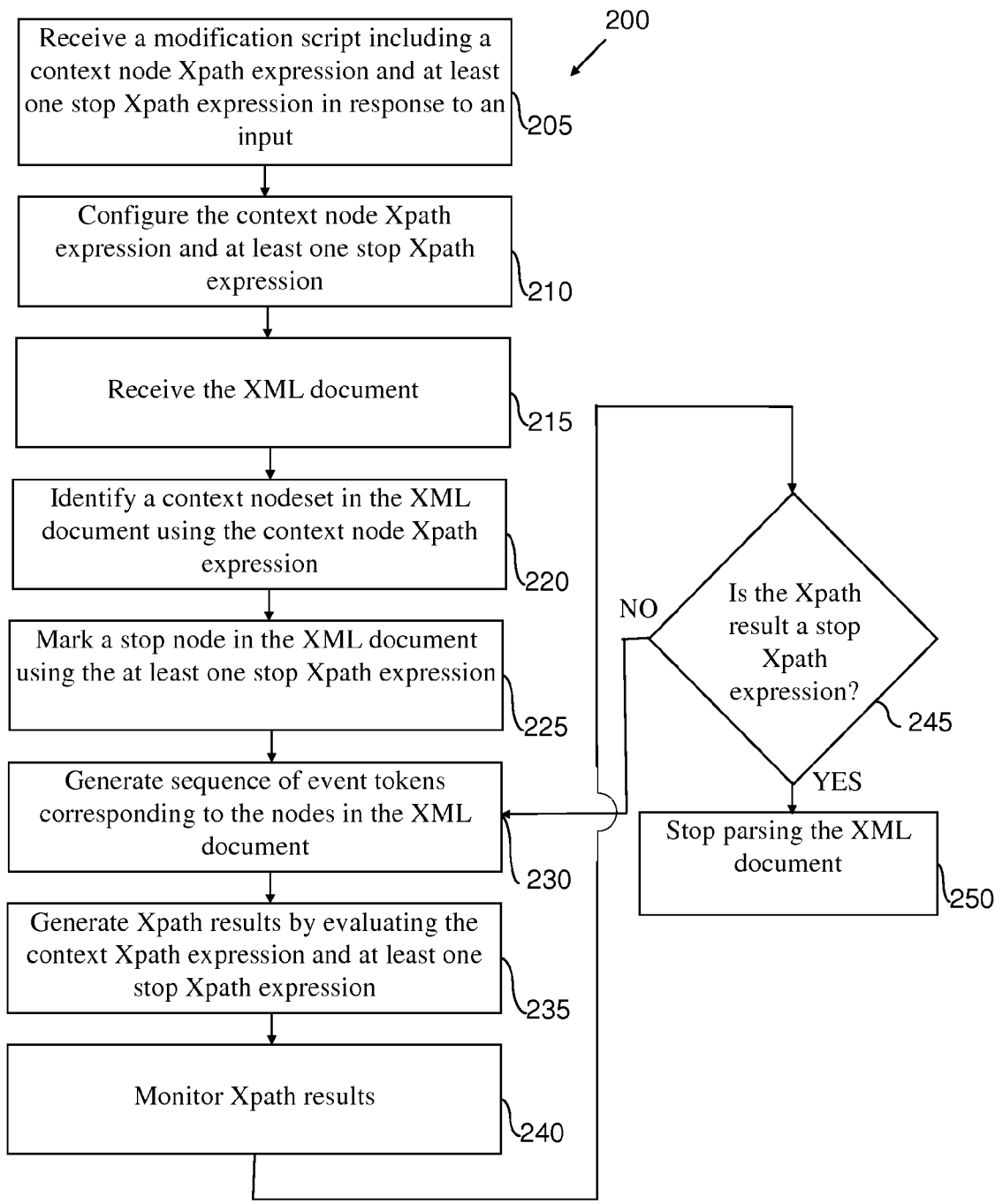
FIG. 2 is a flow diagram illustrating a method for partially parsing an XML document according to an embodiment of the invention.

FIG. 2 is a flow diagram 200 illustrating a method for partially parsing an XML document according to an embodiment of the invention. A context node XPath expression and at least one stop XPath expression is received at step 205. In an embodiment of the invention, a set of XPath expressions may be configured and marked as stop XPath expressions and context node XPath expressions. Various embodiments of the invention have been explained using one context node XPath expression and one stop XPath expression as examples. At step 210, the context node XPath expression and stop XPath expression are configured in the XML processing system. These XPath expressions are parsed, compiled and fed to the XML processing system. In an embodiment of the invention, run time operations are optimized by parsing and compiling XPath expressions during the configuration time of the XML processing system.

In an embodiment of the invention, context node XPath expression is used for identifying a context nodeset in the XML document which needs modification. A context nodeset includes one or more nodes identified by the context node XPath expression. A context node XPath expression will be specified for each modification instruction in the modification script. The modification script may include one or more modification instructions including but not limited to, append, move, modify, add, delete, replace and wrap the XML nodes. Further, various embodiments of the invention have been explained using one modification instruction comprising a context node XPath expression as an example. The stop XPath expression is used for identifying and marking a stop node of the XML document which needs modification. For example, if a new node named <title> needs to be added between the nodes <document> and <chapter>, the context node XPath expression identifies the node <document> and the stop XPath expression identifies the stop node <chapter> in the XML document. An XML document may include several such nodes. At step 215, an XML document is received as a linked list of buffers. At step 220, a context nodeset in the XML document is identified using the context node XPath expression for modification. Similarly, at step 225, a stop node in the XML document is marked using the stop XPath expression. Further, the XML document is parsed at step 230. Parsing an XML document generates sequence of event tokens corresponding to the nodes in the XML document at step 230. The context node and stop XPath expressions are evaluated against this sequence of event tokens and XPath results are generated at step 235.

At step 240, the XPath results are monitored. Further, a check is performed at step 245 to find if any of the XPath results is matching with the stop XPath expression. Parsing the XML document is stopped if any of the XPath result is the stop XPath expression. In other words, XML processing will be stopped if the stop node marked in the XML document (stop node identified by stop XPath expression) is parsed. On the other hand, if any of the XPath results is not matching with the stop XPath expression, step 230 to step 245 are repeated. In an embodiment of the invention, the buffers are parsed and the sequence of event tokens is generated as and when they are available. XPath results are generated for each event token serially. Hence, parsing can be stopped as soon as the XML document is parsed till the stop node.

Figure 3:
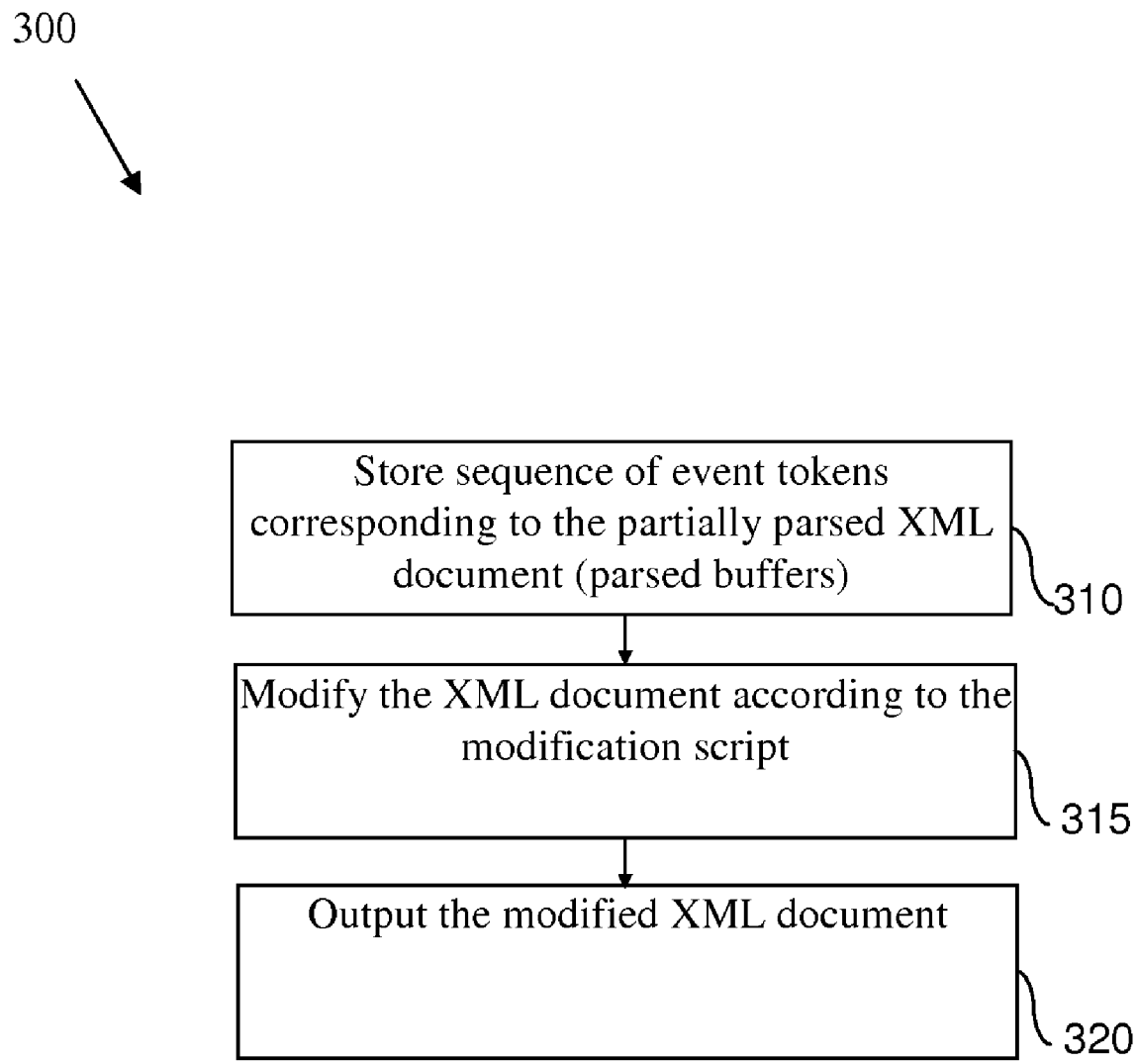
FIG. 3 is a flow diagram illustrating a method for modifying partially parsed XML document according to an embodiment of the invention.

FIG. 3 is a flow diagram illustrating a method for modifying partially parsed XML document according to an embodiment of the invention. The XML document is partially parsed using the method 200 of FIG. 2 according to an embodiment of the invention. After partially parsing the XML document, at step 310, the sequence of event tokens corresponding to the partially parsed XML document are stored. Sequence of event tokens are generated for the corresponding nodes in the XML document which is received as a linked list of buffers. In an embodiment of the invention, sequence of events tokens corresponding to the parsed buffers for modification till the stop node is stored. Storing only the event tokens corresponding to the parsed XML document provides a memory efficient and compact representation of parsed datastructure that point to locations in the parsed XML document.

At step 315, the XML document is modified according to the modification script. The modification script may include modification instructions to append, move, modify, add, delete, replace and wrap the XML nodes. These modification instructions are captured using references to XPath expressions. At step 315, the XML document is modified according to the modification script. During the evaluation, each instruction in the modification script readjusts the linked list of buffers to reflect the desired output using information from XPath results and parsed sequence of event tokens. Further, at step 320, the modified XML document is made available as the output.

Figure 4:
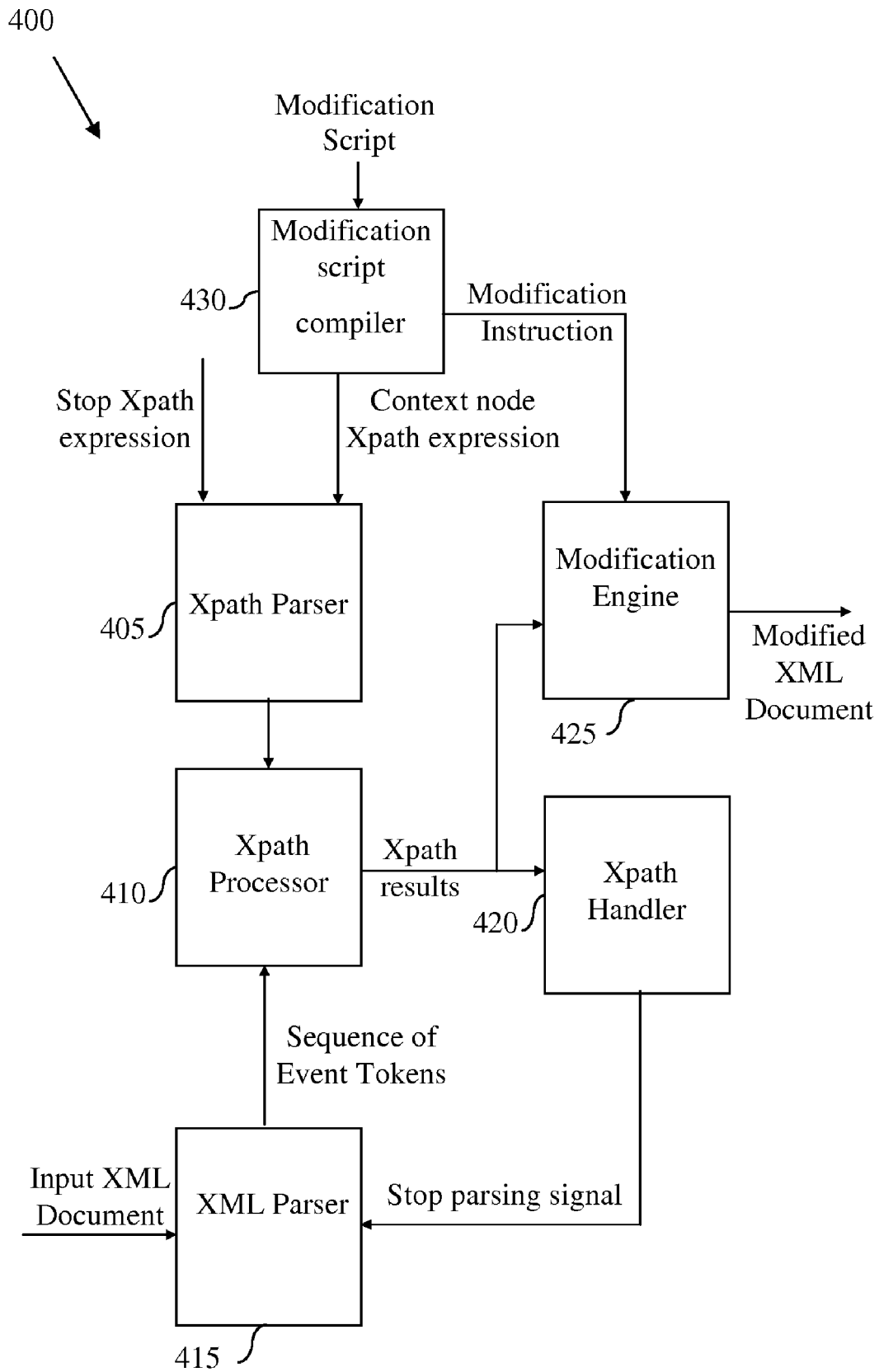
FIG. 4 is a block diagram illustrating an exemplary implementation of a system according to an embodiment of the invention.

FIG. 4 is a block diagram illustrating an exemplary implementation of an XML modifying system 400 according to an embodiment of the invention. The XML modifying system 400 includes an XPath parser 405, an XPath processor 410, an XML parser 415, an XPath handler 420, a modification script compiler 430 and a modification engine 425. The XML modifying system 400 receives at least one stop XPath expression and modification script which includes context node XPath expression as inputs. The modification script is an XML based transformation language based on XPath expressions which includes modification instructions. A modification instruction includes a context node XPath expression which identifies a context nodeset requiring modifications, and the actual modification content. The context node XPath expression is used to identify a context nodeset in the XML document which requires modification. A context node XPath expression has to be specified for every modification instruction in the modification script. The modification script compiler 430 compiles a modification script and provides the context node XPath expression to the XPath parser 405 and supplies the modification instructions to a modification engine 425. The XPath parser 405 also receives a stop XPath expression as input to the XML modifying system 400. The stop XPath expression is used to identify and mark the stop node in the XML document which requires modification. Both XPath expressions are parsed using the XPath parser 405, complied and fed into the XPath processor 410. Further, modification script is also provided to the modification engine 425. XPath expressions are parsed and compiled during configuration of the XML modifying system 400.

XML modifying system 400 further includes XML documents as input to the XML parser 415. The input XML document is received as a linked list of buffers. XML parser 415 parses the input XML document to create sequence of event tokens corresponding to the nodes in the XML document as explained earlier. Sequence of event tokens are encoded in a compact manner and include sufficient information to manipulate the XML nodes. In an embodiment of the invention, memory operations such as bulk allocation and bulk move can be optimized since sequence of event tokens are of fixed length in size. XPath processor 410 receives the sequence of event tokens from the XML parser 415. XPath processor 410 also receives parsed XPath expressions (context node XPath expression and stop XPath expression) from the XPath parser 405. XPath processor 410 evaluates the XPath expressions on the sequence of event tokens and generates XPath results. Each XPath result indicates the type of node, whether the node is an element, an attribute, or a text, and also includes pointers to relevant event tokens. XPath results are fed into the XPath handler 420. XPath handler 420 monitors the XPath results and checks if any of the XPath result is the stop XPath expression. If the XPath result is the stop XPath expression (stop node marked in the XML document), the XPath handler 420 sends a 'stop parsing signal' the XML parser 415 to stop parsing. In this manner, the linked list of buffers is not completely parsed and event tokens are stored only for those portions of the buffers which are parsed. However, XPath results combined with event tokens enable navigation of the partially parsed XML document.

In an embodiment of the invention, the modification engine 425 receives the XPath results generated from the XPath processor 410. Modification engine 425 evaluates the modification script received as the input and performs the instructions in the modification script by capturing the modification instructions using references to XPath expressions. Further, modification engine 425 readjusts the linked list of buffers according to the modification instructions in the modification script to reflect the desired output. Modified XML document is the output from the XML modifying system 400.

In an embodiment of the invention, various modules of FIG. 4 may include one or more algorithms to perform respective functions.

One or more steps of the method illustrated in FIG. 2 and FIG. 3 may be implemented using a computer system. An exemplary computer system is explained in details in conjunction with FIG. 5.

Figure 5:
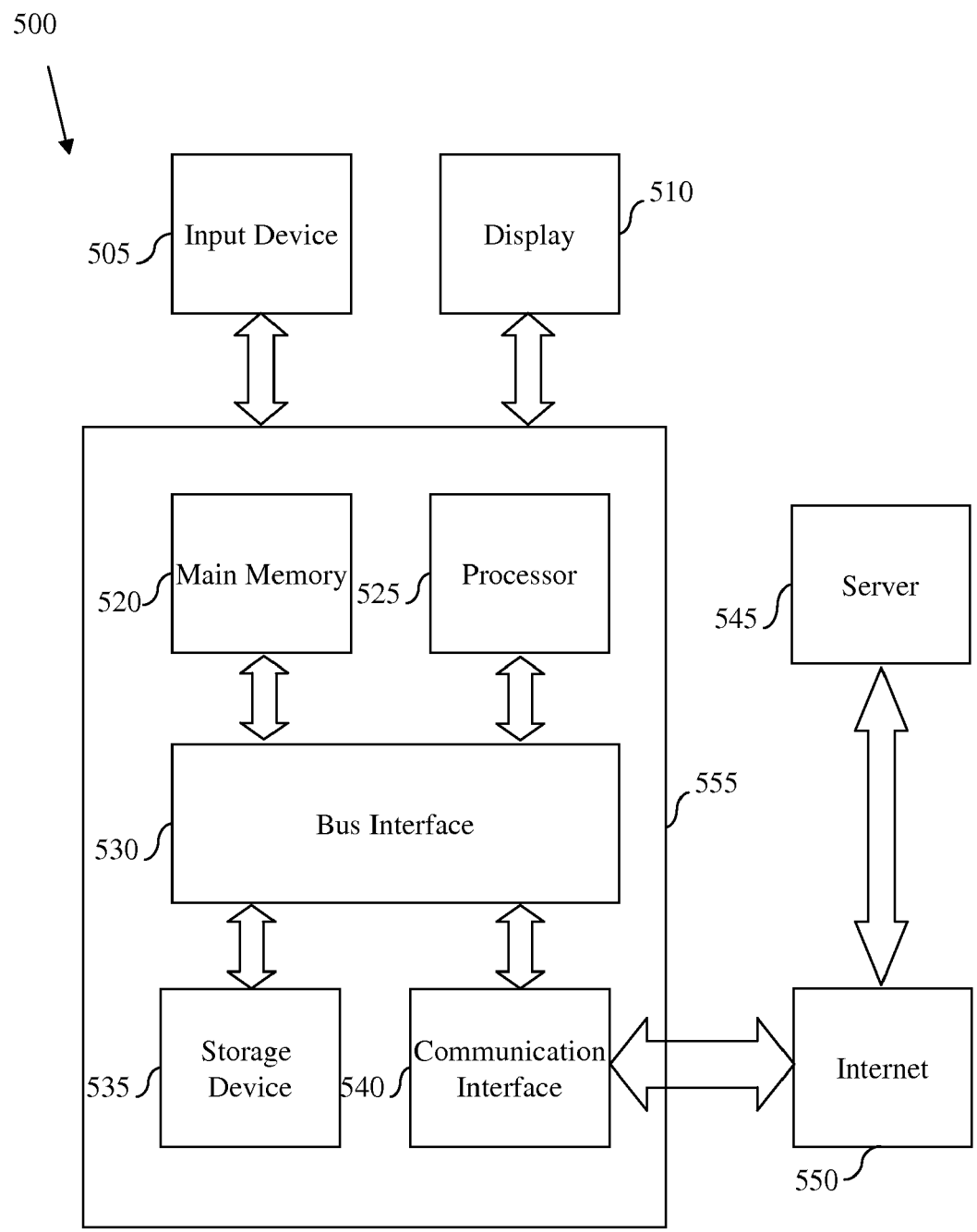
FIG. 5 is a block diagram of an exemplary computer system upon which embodiments of the invention may be implemented.

FIG. 5 is a block diagram of an exemplary computer system 500 upon which various embodiments of the invention may be implemented. Computer system 500 includes a processing unit 555 including a main memory 520, such as a Random Access Memory (RAM) or other dynamic storage device, coupled to a bus interface 530 for storing information and instructions to be executed by processor 525. A storage device 535, such as a magnetic disk or optical disk, is provided and coupled to bus interface 530 for storing information and instructions. Computer system 500 may be coupled via bus interface 530 to a display 510 for displaying information to a user. An input device 505, including alphanumeric and other keys, is coupled to bus interface 530 for communicating information and command selections to processor 525.

Embodiments of the invention are related to the use of computer system 500 for implementing the techniques described herein. According to one embodiment of the invention, those techniques are performed by computer system 500 in response to processor 525 executing one or more sequences of one or more instructions included in main memory 520. Such instructions may be read into main memory 520 from another machine-readable medium product, such as storage device 535. Execution of the sequences of instructions included in main memory 520 causes processor 525 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 500, various machine-readable medium products are involved, for example, in providing instructions to processor 525 for execution. Computer system 500 also includes a communication interface 540 coupled to bus interface 530. Communication interface 540 provides a two-way data communication coupling to internet 550 that is coupled a server 545. Server 545 might transmit a requested code for an application program through internet 550 and communication interface 540.

Embodiments of the invention can be used in web services intermediary for performing light-weight transformations in streaming mode. Examples of light weight transformations include service versioning use cases, wire-format translations for converting between Simple Object Access Protocol (SOAP) and Representational State Transfer (REST). Further, embodiments of the invention can be used as an addition to Extensible Style sheet Language Transformations (XSLT) and XUpdate approaches for making modifications in XML documents. XSLT is an XML-based language used for the transformation of XML documents and XUpdate is a light-weight XML query language for modifying XML documents.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A computer implemented method to modify an XML document, comprising:
   receiving a modification script, the modification script comprising at least one context node XPath expression and modification instructions, and at least one stop XPath expression;
   identifying a context node set in an XML document using a context node XPath expression;
   marking, by a computer, a stop node in a modification script of an XML document using at least one stop XPath expression to stop processing of the XML document, the modification script comprising more than one XPath expression that indicates which modifications to make and where to make the modifications;
   parsing only a portion of the XML document using the modification script up to a stop node;
   responsive to parsing the stop node, generating a feedback signal for discontinuing parsing of the XML document; and
   processing modifications to the parsed XML document up to the stop node.

2. The computer implemented method of claim 1, wherein the parsing comprises:
   receiving the XML document as a linked list of buffers;
   generating a sequence of event tokens corresponding to the nodes in the XML document;
   generating XPath results by evaluating the context node XPath expression and at least one stop XPath expression on the sequence of event tokens; and
   storing event tokens only corresponding to the parsed buffers.

3. The computer implemented method of claim 1, wherein the modification script comprises instructions for each of appending, moving, modifying, deleting, adding, replacing, wrapping and capturing.

4. The computer implemented method of claim 1, wherein the XML document is modified inline without creating an in-memory datastructure of the entire XML document.

5. The computer implemented method of claim 1, wherein modifying the XML document comprises:
   readjusting the linked list of buffers according to the modification script.

6. A computer implemented system, at least partially implemented in hardware, comprising:
   a modification script compiler for compiling a modification script, the modification script comprising modification instructions including a context node XPath expression, wherein the context node XPath expression identifies a context nodeset in an XML document for modification;
   an XPath parser for parsing at least one stop XPath expression to stop processing of the XML document, wherein the at least one stop XPath expression marks a stop node in the modification script of the XML document, the modification script comprising more than one XPath expression that indicates which modifications to make and where to make the modifications;
   an XML parser for parsing only a portion of the XML document received as a linked list of buffers up to the stop node; and
   an XPath handler for monitoring XPath results generated by an XPath processor, wherein the XML parser, responsive to parsing the stop node, generating a feedback signal for discontinuing parsing of the XML document.

7. The computer implemented system of claim 6 further comprising:
   a modification script compiler for compiling a modification script, the modification script comprising modification instructions including a context node XPath expression, wherein the context node XPath expression identifies a context nodeset in an XML document for modification; and
   a modification engine for modifying the XML document according to the modification script, wherein the modification engine readjusts the linked list of buffers according to the modification script.

8. The computer implemented system of claim 6, wherein the XML parser generates a sequence of event tokens corresponding to the nodes in the XML document.

9. The computer implemented system of claim 6, wherein the event tokens are stored only for the parsed buffers.

10. The computer implemented system of claim 6, wherein the XPath processor generates XPath results by evaluating the context node XPath expression and the at least one stop XPath expression.

11. A non-transitory machine-readable medium product, comprising instructions operable to cause a programmable processor to perform a method, the method comprising:
    receiving a modification script, the modification script comprising at least one context node XPath expression and modification instructions, and at least one stop XPath expression;
    identifying a context node set in an XML document using a context node XPath expression;
    marking, by a computer, a stop node in a modification script of an XML document using at least one stop XPath expression to stop processing of the XML document, the modification script comprising more than one XPath expression that indicates which modifications to make and where to make the modifications;

parsing only a portion of the XML document using the modification script up to a stop node;

responsive to parsing the stop node, generating a feedback signal for discontinuing parsing of the XML document; and processing modifications to the parsed XML document up to the stop node.

12. The machine-readable medium product of claim 11, wherein the parsing comprises:

receiving the XML document as a linked list of buffers;

generating a sequence of event tokens corresponding to the nodes in the XML document;

generating XPath results by evaluating the context node XPath expression and at least one stop XPath expression on the sequence of event tokens; and storing event tokens only corresponding to the parsed buffers.

13. The machine-readable medium product of claim 11, wherein modifying the XML document comprises:

readjusting the linked list of buffers according to the modification script.

* * * * *